United States Patent
Momose et al.

(10) Patent No.: US 10,118,096 B2
(45) Date of Patent: Nov. 6, 2018

(54) INFORMATION PROCESSING APPARATUS, INFORMATION PROCESSING SYSTEM, INFORMATION PROCESSING METHOD, AND RECORDING MEDIUM

(71) Applicants: Hiroshi Momose, Kyoto (JP); Kaori Ando, Kyoto (JP); Hideaki Araki, Kyoto (JP); Takayuki Ito, Tokyo (JP); Nayuta Taga, Tokyo (JP); Yoshihiro Hatta, Tokyo (JP)

(72) Inventors: Hiroshi Momose, Kyoto (JP); Kaori Ando, Kyoto (JP); Hideaki Araki, Kyoto (JP); Takayuki Ito, Tokyo (JP); Nayuta Taga, Tokyo (JP); Yoshihiro Hatta, Tokyo (JP)

(73) Assignees: NINTENDO CO., LTD., Kyoto (JP); AMBRELLA CO., LTD., Tokyo (JP); THE POKÉMON COMPANY, Tokyo (JP)

( * ) Notice: Subject to any disclaimer, the term of this patent is extended or adjusted under 35 U.S.C. 154(b) by 985 days.

(21) Appl. No.: 14/257,428

(22) Filed: Apr. 21, 2014

(65) Prior Publication Data
US 2015/0038238 A1 Feb. 5, 2015

(30) Foreign Application Priority Data
Jul. 31, 2013 (JP) ................. 2013-159400

(51) Int. Cl.
*A63F 13/31* (2014.01)
*A63F 13/49* (2014.01)
(Continued)

(52) U.S. Cl.
CPC ............ *A63F 13/49* (2014.09); *A63F 13/825* (2014.09); *A63F 13/95* (2014.09)

(58) Field of Classification Search
CPC ........ A63F 13/31; A63F 13/49; A63F 13/825; A63F 13/95
(Continued)

(56) References Cited

U.S. PATENT DOCUMENTS

| | | | | |
|---|---|---|---|---|
| 5,179,517 A | * | 1/1993 | Sarbin | ................. G06Q 20/341 463/25 |
| 7,883,420 B2 | * | 2/2011 | Bradbury | ................ A63F 13/02 463/43 |

(Continued)

FOREIGN PATENT DOCUMENTS

| | | |
|---|---|---|
| JP | 11-149531 | 6/1999 |
| JP | 2003-339008 | 11/2003 |

(Continued)

OTHER PUBLICATIONS

Wii Software for Pokemon Scrumble U, http://www.nintendo.co.jp/wiiu/wcnj/index.html, Apr. 24, 2013, 1 page.

*Primary Examiner* — Michael Cuff
(74) *Attorney, Agent, or Firm* — Nixon & Vanderhye, P.C.

(57) ABSTRACT

An example system includes a contactless communication part that performs contactless communication with a data storage medium having a contactless communication function; a data writing part that writes data to the data storage medium by the contactless communication part; a storage part that stores the data written by the data writing part; and a data determination part that determines whether the data stored in the data storage medium and the data stored in the storage part have a predetermined relationship with each other or not. When the data determination part determines that both of the data do not have the predetermined relationship with each other, the data writing part overwrites the data stored in the data storage medium with the data stored in the storage part.

12 Claims, 10 Drawing Sheets

(51) Int. Cl.
*A63F 13/825* (2014.01)
*A63F 13/95* (2014.01)

(58) Field of Classification Search
USPC .......................................... 463/43
See application file for complete search history.

(56) References Cited

U.S. PATENT DOCUMENTS

| | | | |
|---|---|---|---|
| 2005/0255913 A1* | 11/2005 | Cok | A63F 13/12 463/31 |
| 2006/0054679 A1* | 3/2006 | Ruping | A63F 13/00 235/375 |
| 2006/0160590 A1* | 7/2006 | Okada | G07F 17/3211 463/1 |
| 2006/0183543 A1* | 8/2006 | Yagi | G07F 17/32 463/31 |
| 2007/0202940 A1* | 8/2007 | Okada | G07F 17/3227 463/25 |
| 2009/0264200 A1* | 10/2009 | Schwartz | A63F 1/02 463/40 |
| 2011/0092280 A1 | 4/2011 | Koyama et al. | |

FOREIGN PATENT DOCUMENTS

| | | |
|---|---|---|
| JP | 2005-270169 | 10/2005 |
| JP | 2006-185245 | 7/2006 |
| JP | 2006-350807 | 12/2006 |
| JP | 2007-34400 | 2/2007 |
| JP | 2008-154620 | 7/2008 |
| JP | 2009-297467 | 12/2009 |

* cited by examiner

FIG. 4

CHARACTER DATA OF FIGURE

| GAME APPARATUS ID | SAVE DATA ID | COUNT VALUE |
|---|---|---|
| GAME APPARATUS A | SAVE α | 5 |
| GAME APPARATUS B | SAVE β | 2 |
| GAME APPARATUS C | SAVE γ | 1 |
| ⋮ | ⋮ | ⋮ |

| CHARACTER CAPABILITY VALUE | UPDATE DATE AND TIME |
|---|---|
| ATTACK=3、SPEED=8、⋯ | 20130707, 17:32 |
| ATTACK=2、SPEED=5、⋯ | 20130630, 20:14 |
| ATTACK=3、SPEED=5、⋯ | 20130704, 18:01 |
| ⋮ | ⋮ |

FIG. 6

BACKUP DATA IN SAVE DATA

| FIGURE ID | GAME APPARATUS ID | SAVE DATA ID | COUNT VALUE |
|---|---|---|---|
| FIGURE a | GAME APPARATUS A | SAVE α | 5 |
| FIGURE b | GAME APPARATUS B | SAVE α | 1 2 |
| FIGURE c | GAME APPARATUS C | SAVE α | 1 |
| ⋮ | ⋮ | ⋮ | ⋮ |

| CHARACTER CAPABILITY VALUE | UPDATE DATE AND TIME |
|---|---|
| ATTACK=3、SPEED=8、⋯ | 20130707, 17:32 |
| ATTACK=7、SPEED=2、⋯ | 20130702, 17:01 |
| ATTACK=5、SPEED=4、⋯ | 20130705, 18:18 |
| ⋮ | ⋮ |

F I G. 8
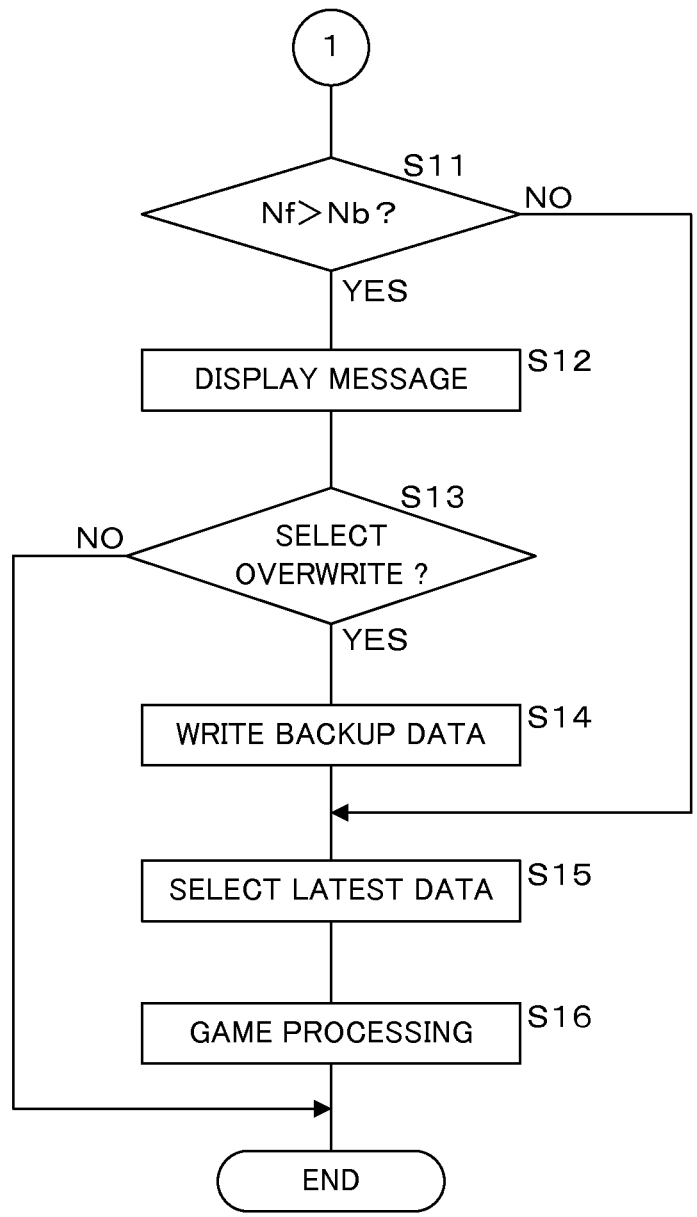

INFORMATION PROCESSING APPARATUS, INFORMATION PROCESSING SYSTEM, INFORMATION PROCESSING METHOD, AND RECORDING MEDIUM

CROSS-REFERENCE TO RELATED APPLICATIONS

This application is based upon and claims the benefit of priority of the prior Japanese Patent Application No. 2013-159400, filed on Jul. 31, 2013, the entire contents of which are incorporated herein by reference.

FIELD

The technology herein relates to an information processing apparatus, an information processing system, an information processing method and a recording medium where contactless communication is performed with a data storage medium and information processing according to the data stored in the data storage medium is performed.

BACKGROUND AND SUMMARY

Conventionally, contactless communication technologies have been widespread such as NFC (near field communication) and RFID (radio frequency identification) where radio communication is performed with an IC (integrated circuit) tag or the like in a contactless manner. Recent information processing apparatuses such as game apparatuses and mobile telephones are beginning to use these contactless communication technologies. For example, a game apparatus or a game program is available where contactless communication is performed with a data storage medium such as a card incorporating an IC tag and the data obtained from the data storage medium is reflected in the contents of the game.

According to an aspect of the embodiment, an information processing apparatus includes: a contactless communication part that performs contactless communication with a data storage medium having a contactless communication function; a data writing part that writes data to the data storage medium by the contactless communication part; a storage part that stores the data written by the data writing part; and a data determination part that determines whether the data stored in the data storage medium and the data stored in the storage part have a predetermined relationship with each other or not, and when the data determination part determines that both of the data do not have the predetermined relationship with each other, the data writing part overwrites the data stored in the data storage medium with the data stored in the storage part.

The object and advantages of the invention will be realized and attained by means of the elements and combinations particularly pointed out in the claims.

It is to be understood that both the foregoing general description and the following detailed description are exemplary and explanatory and are not restrictive of the invention.

These and other objects, features, aspects and advantages of the technology herein will become more apparent from the following detailed description when taken in conjunction with the accompanying drawings.

BRIEF DESCRIPTION OF THE DRAWINGS

FIG. 4 shows an example non-limiting schematic view showing an example of character data of the figure;

FIG. 6 shows an example non-limiting schematic view showing an example of backup data of the figure included in the save data;

FIG. 8 shows an example non-limiting flowchart showing the procedure of the processing of data reading from the figure performed by the game apparatus according to the present example embodiment;

DETAILED DESCRIPTION OF NON-LIMITING EXAMPLE EMBODIMENTS

<System Summary>

Figure 1:
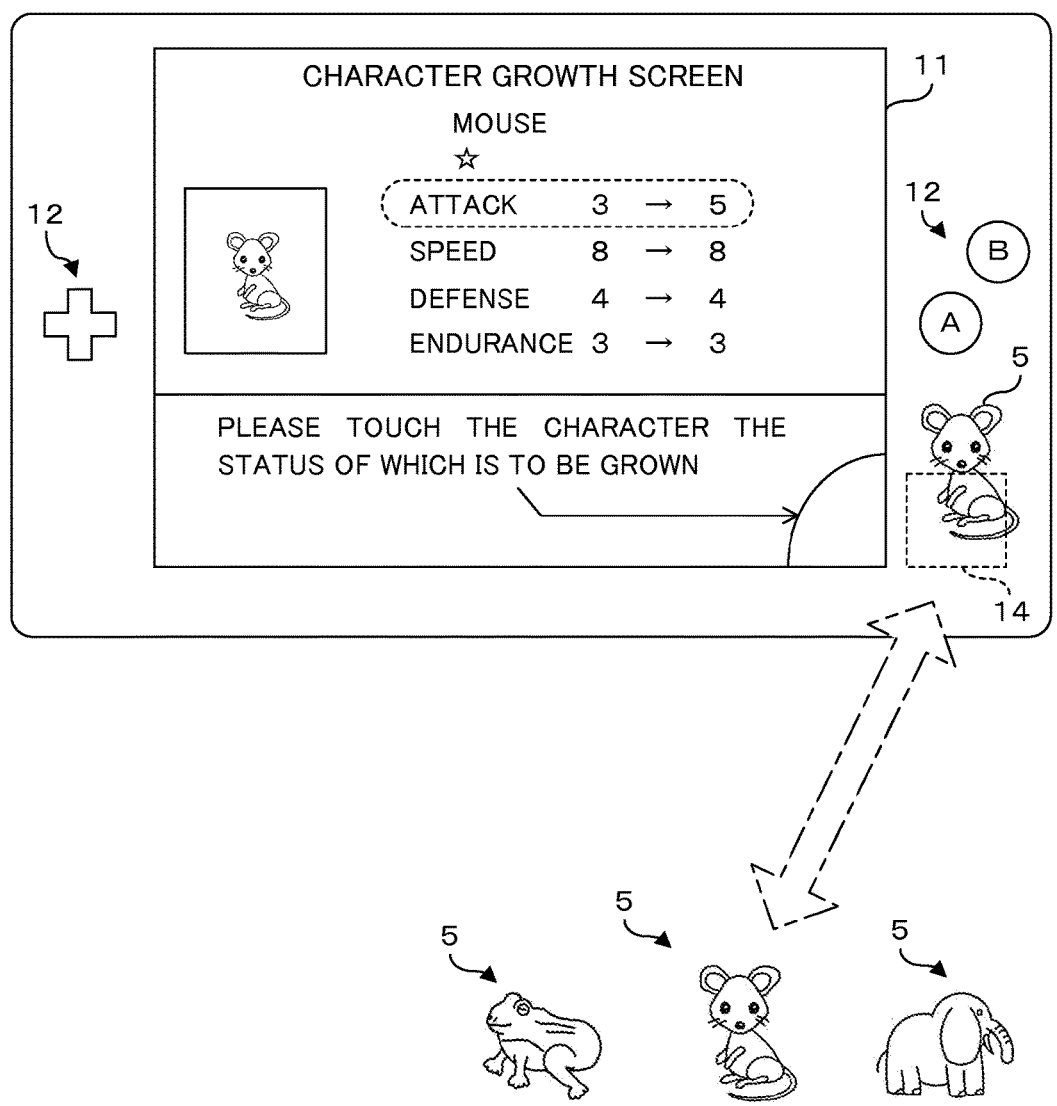
FIG. 1 shows an example non-limiting schematic view for explaining the summary of an information processing system according to a present example embodiment.

FIG. 1 shows an example non-limiting schematic view for explaining the summary of an information processing system according to the present example embodiment. The information processing system according to the present example embodiment includes a portable game apparatus 1 that the user can carry around and one or more than one FIG. 5 used for a game. The game apparatus 1 has a structure in which a display 11, an operation part 12 and the like are provided on one surface of a flat substantially cuboidal housing. The game apparatus 1 according to the present example embodiment has, inside the housing, a contactless communication part 14 that performs contactless communication with the FIG. 5.

Figure 5:
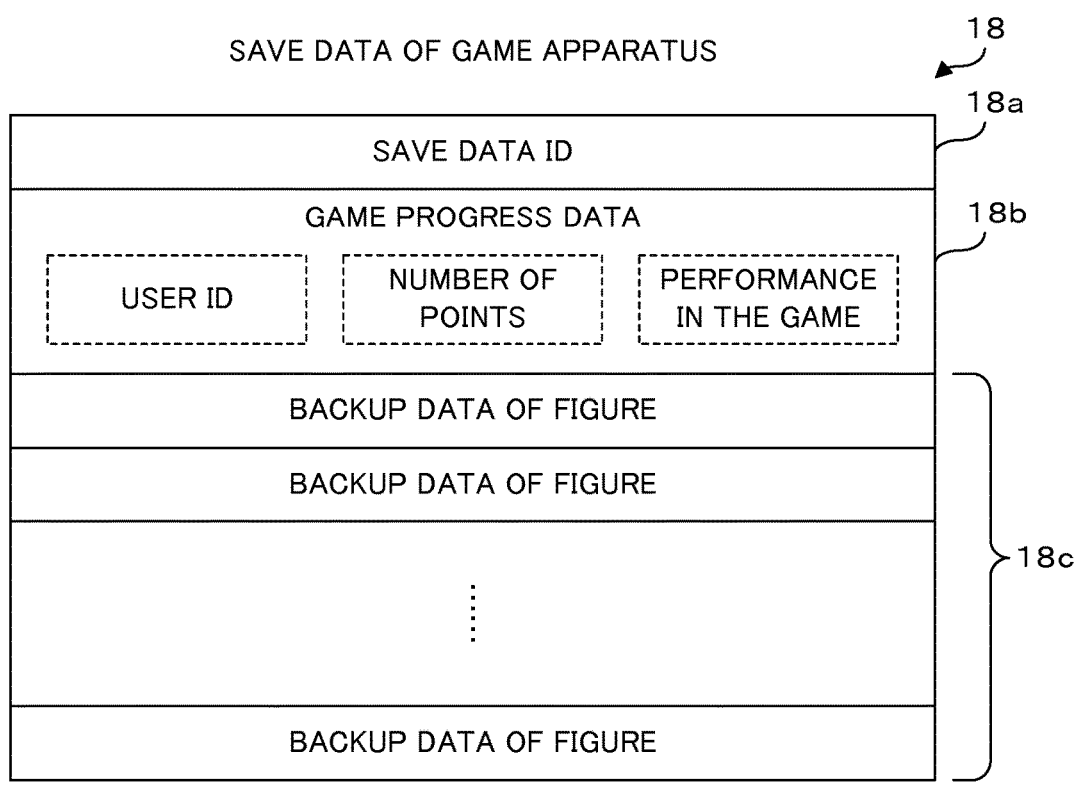
FIG. 5 shows an example non-limiting schematic view showing an example of save data of the game apparatus.

The FIG. 5 is a data storage medium used by the user in a specific game implemented by executing a game program according to the present example embodiment on the game apparatus 1. In the game according to the present example embodiment, a plurality of characters are prepared as player objects operated by the user. The FIG. 5 has a configuration resembling the appearance of a character appearing in the game. The FIG. 5 is formed of a synthetic resin or the like. In the game according to the present example embodiment, the user plays the game by using at least one FIG. 5. The user can add an appropriate FIG. 5 according to his/her taste and use more than one FIG. 5 for the game. In this example, the user plays the game by using three FIG. 5 corresponding to a frog, mouse and elephant characters.

The FIG. 5 is embedded with an IC tag or the like, and is capable of performing contactless communication with the game apparatus 1. The FIG. 5 has a storage part which stores various pieces of data according to its character. The game apparatus 1 is capable of reading data from the FIG. 5 by contactless communication. The game apparatus 1 is capable of performing updating of the data stored in the FIG. 5, addition of data or the like.

In the present example embodiment, capability values such as the attack power, the speed, the defense power and the endurance power are set for each character of the game. The FIG. 5 is capable of storing the capability values of the corresponding character. The user appropriately selects the FIG. 5 used for the game, for example, at the time of start of the game. The user loads data such as the capability values of the character stored in the selected FIG. 5 onto the game apparatus 1. At this time, the user can load the data in the FIG. 5 onto the game apparatus 1 by bringing the selected FIG. 5 into contact with a predetermined area of the game apparatus 1. In FIG. 1, the predetermined area of the game apparatus 1 is the area shown by the broken square and the periphery thereof. The FIG. 5 does not necessarily have to be brought into contact with the game apparatus 1 but only has to be brought close to the predetermined area of the game apparatus 1. The game apparatus 1 reads data from the FIG. 5 by contactless communication and reflects it in the capability values of the character of the game.

The user can increase the capability values of the character based on the points such as the scores or the experience value obtained through playing of the game. In the illustrated example, the attack power of the mouse character is increased from 3 to 5. When a capability value of a character is increased, the user can write the increased capability value to the FIG. 5 corresponding to the character. At this time, the user can write the data to the FIG. 5 by bringing the FIG. 5 into contact with the predetermined area of the game apparatus 1. The game apparatus 1 transmits the increased capability value of the character to the FIG. 5 by contactless communication, and writes it. In the illustrated example, the FIG. 5 of a mouse is brought into contact with the game apparatus 1, thereby writing the capability values of the mouse character to the FIG. 5. At this time, even if the FIG. 5 of a frog or an elephant is brought into contact with the game apparatus 1, the capability values of the mouse character are not written to the FIG. 5.

In the game according to the present example embodiment, the user grows the character by increasing the capability values by using points obtained through playing of the game. The user stores the increased capability values into the FIG. 5 corresponding to the character. By doing this, even when playing the present game with a different game apparatus 1, the user can load the data in this FIG. 5 onto the game apparatus 1 if he/she carries the FIG. 5 with him/her. This enables the user to enjoy the game by using the grown character. Even when playing the game with a different game apparatus 1, the user can grow the character and write the capability values to the FIG. 5. The different game apparatus 1 is, for example, a game apparatus 1 possessed by a friend.

The game apparatus 1 stores information related to the progress of the game, so-called save data in an internal storage part or the like. In the present example embodiment, the information stored as the save data includes information such as the stages cleared in the game, the user's performance related to game playing and the number of points possessed by the user. By creating and storing save data when stopping the game, the user can perform the next game playing from where the user stopped last time.

In the information processing system as described above, the capability values of the character stored in the FIG. 5 can be fraudulently increased, for example, by the following procedure: The user reads the data in the FIG. 5 on the game apparatus 1, obtains points by playing the game and accumulates them. The user performs storage of the progress of the game, so-called a game save under a condition where points are sufficiently accumulated. The user copies the save data stored in the game apparatus 1, to another recording medium or the like. After the backup is completed, the user increases a capability value of the character by consuming accumulated points, and writes the increased capability value to the FIG. 5. Then, by loading the copied save data onto the game apparatus 1, the user can return the condition to that before the point consumption and repetitively increase the capability values of the character.

Therefore, the information processing system according to the present example embodiment is provided with a function to prevent a deed of fraudulently increasing the capability values of the character as described above. In the game apparatus 1 according to the present example embodiment, data the same as the data such as the capability values written to the FIG. 5 is stored in an internal storage part or the like together with the save data. The backup data of the data written to the FIG. 5 is stored in the form of being embedded in the save data. Therefore, when the user copies the save data, the backup data of the FIG. 5 is also copied. When the user loads the copied save data onto the game apparatus 1 to return the condition to that before the point consumption, the backup data of the FIG. 5 is also returned to that before the capability value was increased.

When reading the data in the FIG. 5, the game apparatus 1 compares the read data with the backup data. When these pieces of data do not coincide with each other as a result of the comparison, the game apparatus 1 considers that a fraudulent capability value increase was made, and writes the backup data to the FIG. 5. By doing this, the data stored in the FIG. 5 is returned to the condition before the fraudulent capability value increase was made. Thus, the user cannot fraudulently increase the capability values of the character of the FIG. 5 by copying the save data.

However, the user can use the FIG. 5 not only for his/her own game apparatus 1 but also for a plurality of game apparatuses 1 such as a friend's game apparatus 1. In the system where coincidence between the data in the FIG. 5 and the backup data of the game apparatus 1 is required, when a capability value is increased and the data is written to the FIG. 5 on a friend's game apparatus 1, there is a possibility that it is determined that these pieces of data do not coincide with each other. Therefore, in the information processing system according to the present example embodiment, a data storage area for each game apparatus 1 is provided in the FIG. 5. The FIG. 5 stores a plurality of pieces of data written by a plurality of game apparatuses 1. The game apparatus 1 determines coincidence with the backup data with respect to, of a plurality of pieces of data stored in the FIG. 5, the data written by itself.

Data transmission and reception between the game apparatus 1 and the FIG. 5 is performed by contactless communication. For example, when the game apparatus 1 writes data to the FIG. 5 by contactless communication, if the user performs an operation such as moving the FIG. 5 away from the game apparatus 1 before the writing is completed, a trouble can occur in the data writing. In this case, for example, a condition can occur where data is written to the FIG. 5 although the game apparatus 1 determines that the data writing is a failure. Conversely, for example, a condition can occur where the data is not written to the FIG. 5 although the game apparatus 1 determines that the data writing is completed. When such conditions occur, the data stored in the FIG. 5 and the backup data of the game apparatus 1 disaccord with each other, and there is a possibility that the game apparatus 1 determines that a capability value increase was fraudulently made.

Therefore, in the information processing system according to the present example embodiment, the number of times of data writing to the FIG. 5 is counted. In the present information processing system, the result of this counting is written to the FIG. 5 as the count value, and the game apparatus 1 stores the count value as the backup data. When data writing (updating of the count value) is performed, the game apparatus 1 writes it to the FIG. 5 after writing the backup data. Therefore, when data writing to the FIG. 5 is a failure, a condition can occur where the count value stored in the FIG. 5 is lower than the count value of the backup data. Therefore, when the count value stored in the FIG. 5 is not more than the count value of the backup data, the game apparatus 1 determines that no fraud was committed even if the other pieces of information do not coincide. When fraudulent data rewriting or the like was performed, the possibility is high that only data writing to the FIG. 5 was performed without writing to the backup data of the corresponding game apparatus 1 being performed. Therefore, it is considered that the count value of the backup data does not change and the count value stored in the FIG. 5 increases. Therefore, when the count value stored in the FIG. 5 is higher than the count value of the backup data, the game apparatus 1 determines that a fraud was committed.

<System Configuration>

Figure 2:
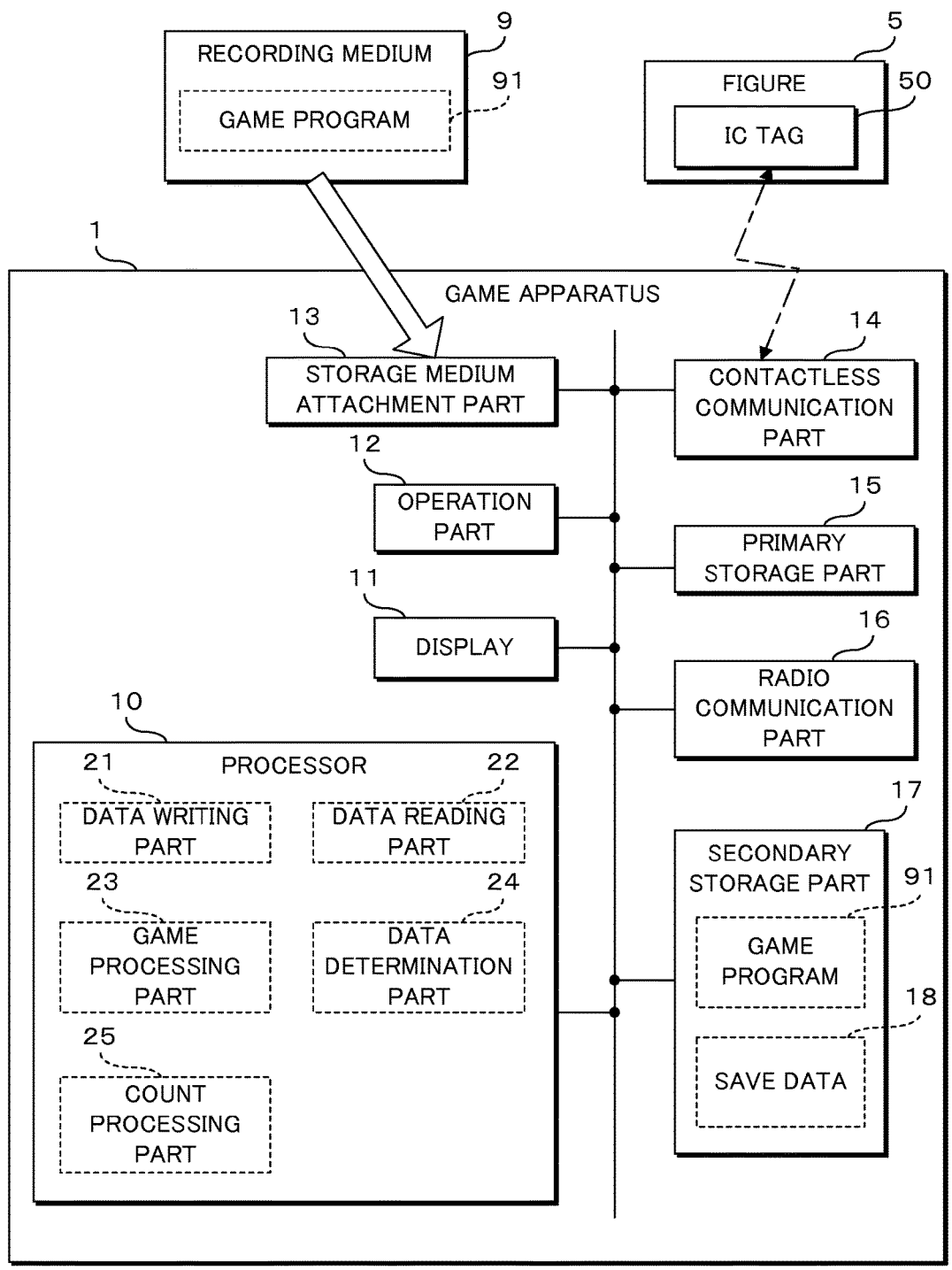
FIG. 2 shows an example non-limiting block diagram showing the structure of a game apparatus.

FIG. 2 shows an example non-limiting block diagram showing the structure of the game apparatus 1. The game apparatus 1 according to the present example embodiment includes a processor 10, the display 11, the operation part 12, a storage medium attachment part 13, the contactless communication part (contactless communication circuit) 14, a primary storage part 15, a radio communication part 16, and a secondary storage part 17. The processor 10 of the game apparatus 1 is structured by using an arithmetic processing unit such as a CPU (central processing unit). The processor 10 reads out, to the primary storage part 15, a game program 91 stored in the secondary storage part 17 or a game program 91 recorded on a recording medium 9 attached to the storage medium attachment part 13, and executes it. By doing this, the processor 10 performs various kinds of information processing related to the game. For example, the processor 10 performs the processing of accepting an operation performed on the operation part 12. For example, the processor 10 performs processing such as a determination of the game according to the accepted operation. For example, the processor 10 performs the processing of generating a game image displayed on the display 11 according to the accepted operation, an event in the game, or the like.

The display 11 is structured by using a liquid crystal panel or the like, and displays the image supplied from the processor 10. The operation part 12 is, for example, a push button or a touch panel provided on the display 11. The operation part 12 notifies the processor 10 of the contents of the operation performed by the user. The contents of the operation are, for example, a depression or a release of a button. The storage medium attachment part 13 is structured so that the recording medium 9 of a card type, a cassette type, a disc type or the like is detachably attachable thereto. The processor 10 is capable of reading the game program 91 and various pieces of data from the recording medium 9 attached to the storage medium attachment part 13.

The contactless communication part 14 performs contactless data transmission and reception by radio with the FIG. 5 or the like according to a communication standard such as ISO/IEC 18092 (so-called NFC). The communication distance of the contactless communication part 14 is approximately several centimeters to several meters. The contactless communication part 14 transmits a signal providing an instruction to read stored data, to an IC tag 50 embedded in the FIG. 5. The contactless communication part 14 receives desired data from the IC tag 50 of the FIG. 5 as a response to the reading instruction. The contactless communication part 14 has a so-called IC tag reader function. The contactless communication part 14 can make the IC tag 50 write data by transmitting a signal providing a writing instruction together with write data. That is, the contactless communication part 14 has an IC tag writer function. Here, the communication method of the contactless communication part 14 is not limited to NFC. The communication method of the contactless communication part 14 may be various communication methods, such as RFID, adopted as contactless communication, near field communication or the like.

The primary storage part 15 is structured by using a semiconductor memory element or the like. The primary storage part 15 temporarily stores various pieces of data generated in connection with the arithmetic processing by the processor 10. The radio communication part 16 performs data transmission and reception with a server apparatus or a different game apparatus 1 via a network such as a mobile telephone network or a wireless LAN (local area network). For example, the game apparatus 1 is capable of performing communication with a server apparatus by the radio communication part 16, downloading the game program 91 or the like and storing it into the secondary storage part 17.

The secondary storage part 17 is structured by using a non-volatile storage device having a large capacity compared with the primary storage part 15. The secondary storage part 17 stores the game program 91, save data 18 and the like. The save data 18 is data storing information such as the progress of the game implemented by the game program 91 and the number of points possessed by the user. In the present example embodiment, the save data 18 includes the backup data of the data written to the FIG. 5.

In the game apparatus 1 according to the present example embodiment, the processor 10 executes the game program 91. Thereby, a data writing part 21, a data reading part 22, a game processing part 23, a data determination part 24, a count processing part 25 and the like are implemented as software functional blocks in the processor 10. The data writing part 21 performs the processing of writing data to the FIG. 5 by contactless communication. The data reading part 22 performs the processing of reading data from the FIG. 5 by contactless communication. The game processing part 23 performs various kinds of determination processing, event processing or the like related to the game. The data determination part 24 performs comparison and determination between the data stored in the FIG. 5 and the backup data that the game apparatus 1 stores in the save data 18 of the secondary storage part 17. The count processing part 25 performs the processing of counting the number of times of data writing to the FIG. 5.

Figure 3:
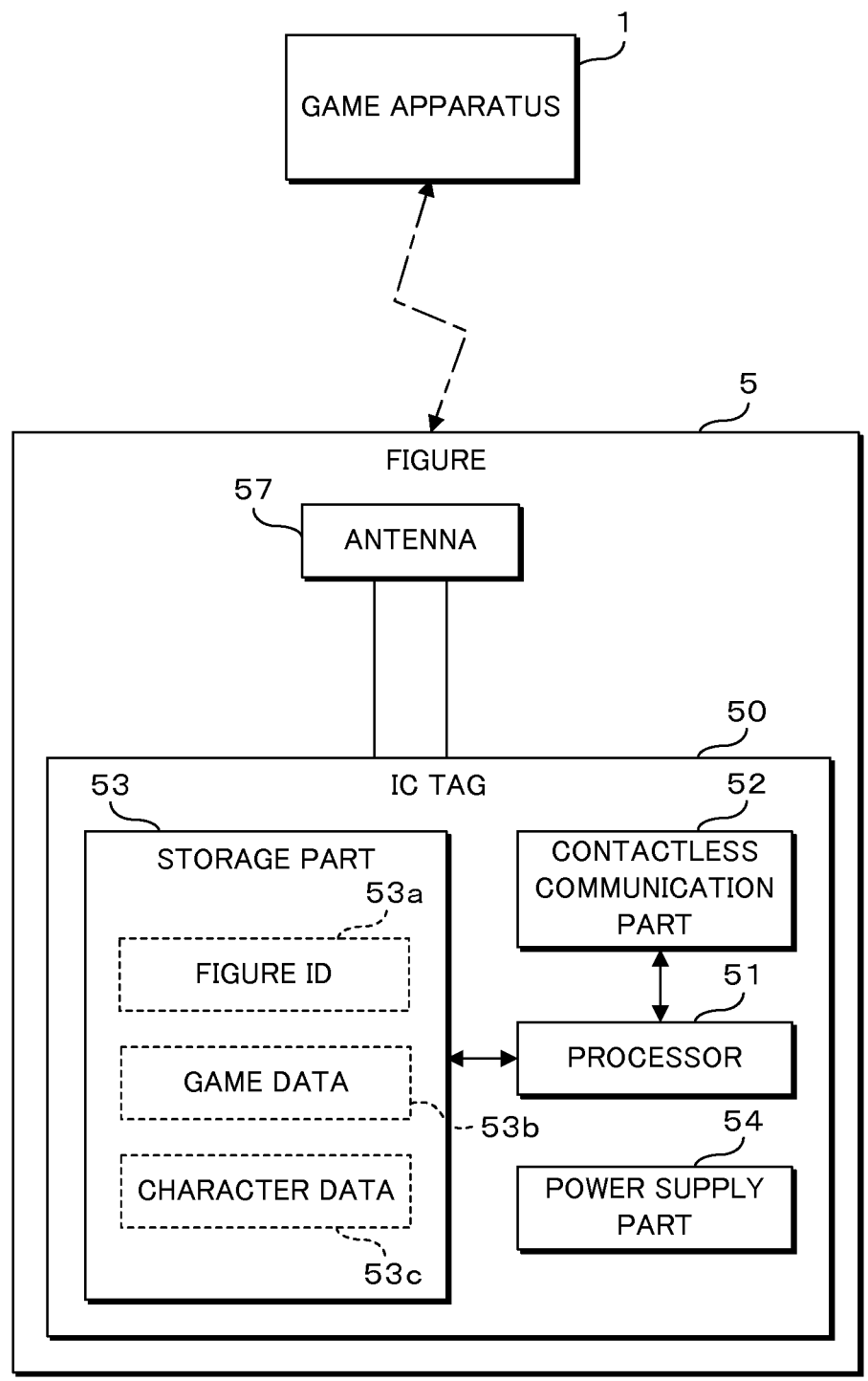
FIG. 3 shows an example non-limiting block diagram showing the structure of a figure.

FIG. 3 shows an example non-limiting block diagram showing the structure of the FIG. 5. The FIG. 5 according to the present example embodiment is, for example, a data storage medium having a structure in which the IC tag 50 and an antenna 57 are embedded in a molded object of a synthetic resin. The antenna 57 has, for example, a structure in which a metal wire is spirally arranged in the FIG. 5 and both ends thereof are connected to the IC tag 50. The IC tag 50 is provided as one IC chip. The IC tag 50 includes a processor 51, a contactless communication part 52, a storage part 53 and a power supply part 54.

The IC tag 50 does not have a power source such as a battery. The IC tag 50 operates on an electromotive force generated by electromagnetic induction or the like when a radio signal from the game apparatus 1 is received by the antenna 57. The IC tag 50 is a so-called passive-type tag. The power supply part 54 supplies power to the processor 51, the contactless communication part 52, the storage part 53 and the like in the IC tag 50 based on the electromotive force. The operations of the components are performed by this power supply. While the IC tag 50 is of a passive type in the present example embodiment, it may be of an active type.

The contactless communication part 52 of the IC tag 50 receives a signal transmitted from the game apparatus 1 by the antenna 57, and supplies the data related to the received signal to the processor 51. The contactless communication part 52 transmits the data supplied from the processor 51, from the antenna 57 to the game apparatus 1. The storage part 53 is formed of a data rewritable non-volatile memory element. The storage part 53 stores a FIG. 1D (identifier) 53a individually assigned to the IC tag 50, game data 53b and character data 53c related to the game according to the present example embodiment, and the like. According to the data supplied from the contactless communication part 52, the processor 51 reads data from the storage part 53 and supplies the read data to the contactless communication part 52 so as to be transmitted to the game apparatus 1. The processor 51 performs data writing to the storage part 53 according to the data supplied from the contactless communication part 52.

<Game Processing>

Next, an example of the game will be described that is implemented by the processor 10 of the game apparatus 1 executing the game program 91 according to the present example embodiment. In the game of this example, the user selects one player character from among a plurality of characters. The user operates the selected player character with the operation part 12, and performs a fight, a competition or the like with an enemy character. The operation of the enemy character may be performed by the processor 10, or in the case of a communication competition, may be performed by the user of another game apparatus 1.

A plurality of characters selectable as the player character are provided as FIG. 5. The user selects the item of data reading from the FIG. 5, for example, from a menu screen of the game displayed on the display 11 of the game apparatus 1. The processor 10 of the game apparatus 1 displays a message such as "Please touch the FIG. 5" on the display 11, and waits until contactless communication with the IC tag 50 of the FIG. 5 becomes possible. The user selects the FIG. 5 of the character used as the player character, from among the FIG. 5 that the user carries with him/her, and brings the selected FIG. 5 into contact with the predetermined area of the game apparatus 1. By doing this, contactless communication between the game apparatus 1 and the FIG. 5 becomes possible. The data reading part 22 of the processor 10 of the game apparatus 1 reads the FIG. 1D 53a, the game data 53b and the character data 53c stored in the storage part 53 from the IC tag 50 of the FIG. 5.

The FIG. 1D 53a of the FIG. 5 is identification information uniquely assigned to this FIG. 5. Even for the FIG. 5 of the same character, different figure IDs 53a are stored. The FIG. 1D 53a is data that cannot be rewritten. The processor 10 of the game apparatus 1 determines the kind of the character of the FIG. 5 based on the FIG. 1D 53a read from the FIG. 5 by the data reading part 22. In the example shown in FIG. 1, the kinds of the characters are a frog, a mouse and an elephant. Since the game apparatus 1 determines the type of the character, data such as a correspondence table of the figure IDs 53a assigned to the FIG. 5 and the kinds of the characters is stored in the secondary storage part 17 or the recording medium 9 together with the game program 91.

The game data 53b of the FIG. 5 includes identification information for identifying the game according to the present example embodiment and information on the user who played the game. The game apparatus 1 can confirm that this FIG. 5 is one used for the game according to the present example embodiment, based on the identification information included in the game data 53b. The game apparatus 1 can confirm the user of this FIG. 5 based on the user information included in the game data 53b. The game data 53b may be rewritable data.

The character data 53c of the FIG. 5 includes information such as the capability values of the corresponding character. FIG. 4 shows an example non-limiting schematic view showing an example of the character data 53c of the FIG. 5. The character data 53c stored in the storage part 53 of the IC tag 50 of the FIG. 5 includes information such as the game apparatus ID, the save data ID, the count value, the character capability values and the update date and time. As described above, data reading and writing from and to the FIG. 5 can be performed on different game apparatuses 1. A game apparatus ID is uniquely assigned to each game apparatus 1, and in the character data 53c of the FIG. 5, the save data ID, the count value, the character capability values and the update date and time are stored so as to be associated with the game apparatus ID.

The save data ID is identification information uniquely assigned to the save data 18 that the game apparatus 1 stores in the secondary storage part 17. The count value is the number of times of data rewriting counted by the count processing part 25 of the game apparatus 1. To the count value, one is added every time data writing to the FIG. 5 is performed. The character capability values are values representative of capabilities such as the attack power and the speed of the character corresponding to this FIG. 5. The update date and time is information representative of the date and time when this data was written to the FIG. 5.

In the character data 53c according to the present example embodiment, the number of sets of data such as the save data ID and the character capability values stored for one game apparatus ID is one. For example, when a game apparatus 1 provided with "game apparatus A" as the game apparatus ID (hereinafter, referred to merely as game apparatus A) writes data to the FIG. 5, the information such as the save data ID and the character capability values corresponding to the game apparatus A of the character data 53c is updated. In this case, the information such as the save data ID and the character capability values of the other game apparatus IDs is not updated. When a game apparatus 1 the game apparatus ID of which is not stored in the character data 53c performs data writing, a new game apparatus ID and information such as the save data ID and the character capability values corresponding thereto are added to the character data 53c. When the storage part 53 does not have enough free space for adding the new information, the information with the earliest update date and time is deleted and the new information is added. Such data writing control may be performed by the game apparatus 1 or may be performed by the processor 51 of the IC tag 50 of the FIG. 5.

When reading the character data 53c from the FIG. 5, the data reading part 22 of the game apparatus 1 reads not only the information corresponding to its own game apparatus ID but also the information such as the character capability values and the update date and time corresponding to all the game apparatus IDs. The processor 10 of the game apparatus 1 selects the character data 53c with the latest update date and time irrespective of the game apparatus ID from among the read pieces of character data 53c. The processor 10 reflects the selected latest character capability values in the player character of the game.

The user can select the character reflecting the data read from the FIG. 5 to start the game. The processor 10 of the game apparatus 1 starts the game processing with the user selected character as the player character. For example, the game apparatus 1 displays on the display 11 the player character selected by the user and a plurality of enemy characters controlled by the processor 10 of the game apparatus 1. The user can move the player character by using the operation part 12. The user can make the player character attack the enemy characters by using the operation part 12. The processor 10 of the game apparatus 1 determines the success or failure of the player character's attack on the enemy characters according to the user's operation. The processor 10 determines the success or failure of the enemy characters' attacks on the player character.

In the game according to the present example embodiment, the user can obtain points according to the performance in the game or the like. The user can increase the capability values such as the attack power and the speed of the character by using the obtained points. When the growth of the character is selected by the user, for example, from a menu, the processor 10 of the game apparatus 1 displays a character growth screen as shown in FIG. 1. On the character growth screen, by using the operation part 12, the user can appropriately select a capability value such as the attack power or the speed of the character. The user can increase the selected capability value by consuming points that he/she possesses.

After increasing the capability value of the character, the user can write the increased capability value to the FIG. 5 corresponding to this character. The processor 10 of the game apparatus 1 accepts an operation of increasing the capability value by the operation part 12, and increases the capability value of the character. Then, the processor 10 displays a message prompting the user to perform the operation of making the corresponding FIG. 5 be read. In the example shown in FIG. 1, the game apparatus 1 displays a message "Please touch the character the status of which is to be grown" on the display 11. In response to this message, the user brings the FIG. 5 corresponding to the character the capability value of which is increased into contact with the predetermined area of the game apparatus 1. By doing this, contactless communication between the game apparatus 1 and the FIG. 5 is enabled.

The processor 10 of the game apparatus 1 performs contactless communication with the FIG. 5 by the contactless communication part 14 to obtain the FIG. 1D 53a stored in the storage part 53 of the IC tag 50. The processor 10 determines whether or not the FIG. 5 with which the contactless communication is performed corresponds to the character the capability value of which is increased, based on the FIG. 1D 53a obtained from the FIG. 5. When the FIG. 5 with which the contactless communication is performed does not correspond to the character the capability value of which is increased, the processor 10 displays an error message or the like on the display 11. When the FIG. 5 corresponds to the character the capability value of which is increased, the processor 10 transmits by the contactless communication part 14 a data rewriting instruction to the FIG. 5 together with information such as the new capability value. The IC tag 50 of the FIG. 5 updates the character data 53c stored in the storage part 53 in response to the rewriting instruction from the game apparatus 1. As described above, by updating the character data 53c stored in the storage part 53 of the FIG. 5, even when performing the game with another game apparatus 1, the user can enjoy the game by using the character the capability value of which is increased.

<Save Data>

Aside from writing the capability values of the character to the FIG. 5, the user can store the progress of the game into the game apparatus 1. The progress of the game stored in the game apparatus 1 may include information such as the stages cleared in the game and the user's performance related to game playing. In the present example embodiment, the stored progress of the game includes information about the number of points that the user has obtained in the game and possesses at the point of time. When the item of game saving is selected, for example, on a menu screen of the game, the processor 10 of the game apparatus 1 stores information related to the progress of the game in the secondary storage part 17 as the save data 18.

FIG. 5 shows an example non-limiting schematic view showing an example of the save data 18 of the game apparatus 1. The save data 18 that the game apparatus 1 stores in the secondary storage part 17 includes information such as a save data ID 18a, a game progress data 18b and backup data 18c of the figure. When the save data 18 is not stored in the secondary storage part 17 such as when the user performs game saving for the first time, the processor 10 of the game apparatus 1 creates new save data 18 and stores it. The processor 10 determines the save data ID 18a, for example, based on a random number, and stores it in the save data 18 together with other information. Thereafter, even when the user repetitively performs game saving, the processor 10 does not change the save data ID 18a assigned to the save data 18. The save data ID included in the character data 53c of the FIG. 5 shown in FIG. 4 is the save data ID 18a assigned to the save data 18 related to the game played by the user on the game apparatus 1 that performed data writing to the FIG. 5.

The game progress data 18b of the save data 18 includes a plurality of pieces of information such as the user ID, the number of points and the performance in the game. The game progress data 18b includes information necessary for the processor 10 of the game apparatus 1 to resume the stopped game from where it was stopped. When the user performs the game saving operation on the game apparatus 1, the processor 10 updates the game progress data 18b of the save data 18.

The save data 18 includes, as the backup data 18c, a backup of written data with respect to one or more than one FIG. 5. FIG. 6 shows an example non-limiting schematic view showing an example of the backup data 18c of the FIG. 5 included in the save data 18. As mentioned above, a FIG. 1D 53a is uniquely assigned to each FIG. 5. In the backup data 18c of the game apparatus 1, data written with respect to each FIG. 5 is stored so as to be associated with this FIG. 1D. The write data backed up in the backup data 18c is information such as the game apparatus ID, the save data ID, the count value, the character capability values and the update date and time. The backed up write data is substantially the same as the character data 53c of the FIG. 5 shown in FIG. 4.

When the user increases a character capability value and writes the data to the FIG. 5 by contactless communication, the processor 10 of the game apparatus 1 stores this data in the save data 18 of the secondary storage part 17. The processor 10 stores data the same as that written to the FIG.

5, in the save data 18 of the secondary storage part 17 so as to be associated with the FIG. 1D of the FIG. 5. In the save data 18 according to the present example embodiment, the number of sets of write data backed up for one FIG. 1D is one. For example, when data writing is performed to a FIG. 5 provided with "figure a" as the FIG. 1D (hereinafter, referred to merely as figure a), the processor 10 updates the data corresponding to the figure a of the save data 18. In this case, the data corresponding to the other FIG. 5 is not updated. When data writing is performed to a FIG. 5 the FIG. 1D of which is not stored in the save data 18, the processor 10 adds the new data to the save data 18.

When data writing to the FIG. 5 is performed, the processor 10 performs the processing of counting the number of times of writing by the count processing part 25. The count processing part 25 obtains the count value from the backup data corresponding to the FIG. 1D of the FIG. 5 to which the data is written. The count processing part 25 adds one to the obtained count value. The processor 10 sets the count value increased by the processing by the count processing part 25, as the count value of the data written to the FIG. 5. The processor 10 writes data having the count value calculated by the count processing part 25 to the FIG. 5, and stores its backup data in the save data 18 of the secondary storage part 17. Unless a fraud or the like is committed, it is expected that the count value of the data in the FIG. 5 and the count value of the backup data corresponding to this FIG. 5 coincide with each other.

For the number of pieces of backup data 18c of the FIG. 5 that can be stored in the save data 18, a sufficiently high upper limit value such as 1000 or 10000 is set, for example, according to the capacity of the secondary storage part 17. Alternatively, it may be made possible to add the backup data 18 until there is no free space left in the secondary storage part 17 without a specific upper limit value being provided. In any case, when it becomes impossible to add the backup data 18c, the game apparatus 1 deletes the backup data 18c with the earliest update date and time and stores new backup data 18c.

When the save data 18 stored in the secondary storage part 17 is backed up to a recording medium such as a memory card on the game apparatus 1, the save data ID 18a, the game progress data 18b and the backup data 18c of the FIG. 5 are backed up indivisibly. For this, it is desirable that the save data 18 be stored as one file in the secondary storage part 17.

In the present example embodiment, the number of pieces of save data 18 stored in the secondary storage part 17 of the game apparatus 1 is one, and the secondary storage part 17 never stores a plurality of pieces of save data 18. However, for example, a structure may be adopted in which pieces of save data 18 that differ among users or the like can be created and a plurality of pieces of save data 18 can be stored in the secondary storage part 17. In this case, the pieces of save data 18 are provided with different save data IDs 18a, respectively, and are identified thereby.

<Fraud Prevention Processing>

When the data reading part 22 of the processor 10 reads data from the FIG. 5 by contactless communication, the game apparatus 1 according to the present example embodiment determines whether a fraud was performed or not based on the read data. At this time, the data determination part 24 of the processor 10 compares the data read from the FIG. 5 with the backup data 18c stored in the save data 18 of the secondary storage part 17. The data determination part 24 determines the presence or absence of a fraud according to whether these pieces of data satisfy a predetermined relationship or not.

As described above, the character data 53c read from the FIG. 5 by the data reading part 22 includes data related to a plurality of game apparatuses 1. The data determination part 24 determines whether data associated with the game apparatus ID assigned to the own game apparatus 1 and the save data ID of the save data 18 used for the game is present in the character data 53c included in the read data or not. The data determination part 24 determines whether the backup data associated with the FIG. 1D 53a read by the data reading part 22 is present in the save data 18 of the secondary storage part 17 or not. There can be four combinations of results of the determination of the presence or absence of the character data 53c in the FIG. 5 and the presence or absence of the backup data in the save data 18 by the data determination part 24. Hereinafter, these combinations will be described.

(a) A Case where the Character Data 53c is Present in the FIG. 5 and the Backup Data is Present in the Save Data 18

This is a case where data with which the own game apparatus ID and the save data ID are associated is included in the character data 53c read from the FIG. 5 and the backup data associated with the FIG. 1D 53a read from the FIG. 5 is included in the save data 18 of the secondary storage part 17. That is, this is a case where the game apparatus ID and the save data ID coincide between the character data 53c of the FIG. 5 and the backup data of the save data 18. In this case, the data determination part 24 of the processor 10 compares the count value included in the character data 53c with the count value included in the backup data.

When the count value of the character data of the FIG. 5 is higher than the count value of the backup data of the game apparatus 1, the data determination part 24 determines that some fraud was committed. In this case, the processor 10 displays, for example, an error message on the display, and then, performs the processing of writing data the same as the backup data to the FIG. 5. By doing this, the character data 53c of the FIG. 5 is returned to the condition before the fraud was committed.

When the count value of the character data of the FIG. 5 is not more than the count value of the backup data of the game apparatus 1, the data determination part 24 determines that no fraud was committed. Then, the processor 10 of the game apparatus 1 selects data with the earliest update date and time from the read character data 53c. The processor 10 performs the game processing by the game processing part 23 with a character in which the latest character capability values are reflected.

(b) A Case where the Character Data 53c is Absent in the FIG. 5 and the Backup Data is Absent in the Save Data 18

This is a case where data with which the own game apparatus ID and the save data ID are associated is not included in the character data 53c read from the FIG. 5 and the backup data associated with the FIG. 1D 53a read from the FIG. 5 is not included in the save data 18 of the secondary storage part 17. In this case, the data determination part 24 determines that no fraud was committed with respect to this FIG. 5. However, the subsequent processing by the processor 10 differs according to whether the character data 53c of another game apparatus ID or save data ID is present in the FIG. 5 or not.

When the character data 53c of another game apparatus ID or save data ID is present in the FIG. 5, although no data writing was performed to this FIG. 5 on the present game apparatus 1, data writing was performed on another game apparatus 1. In this case, the processor 10 selects the data with the latest update date and time from the character data 53c read from the FIG. 5. The processor 10 performs the game processing by the game processing part 23 with a character in which the latest character capability values are reflected.

When there is no character data 53c in the FIG. 5, it can be determined that the user uses this FIG. 5 for the game for the first time. In this case, the processor 10 performs the game processing by the game processing part 23 with the character corresponding to the FIG. 1D 53a of the FIG. 5 by using the capability values of the character as the initial values.

In any case, when writing data to the FIG. 5, the processor 10 additionally writes new character data 53c to the FIG. 5. The count value of the new character data 53c is set to 1. The processor 10 additionally stores the backup data of the character data 53c written to the FIG. 5, into the save data 18 of the secondary storage part 17.

(c) a Case where the Character Data 53c is Absent in the FIG. 5 and the Backup Data is Present in the Save Data 18

In this case, the data determination part 24 determines that no fraud was committed with respect to this FIG. 5. As reasons that this condition occurs, two patterns can be considered according to whether the character data 53c of another game apparatus ID or save data ID is present in the FIG. 5 or not.

When the character data 53c of another game apparatus ID or save data ID is present in the FIG. 5, for example, a possibility is considered that data was written to the storage part 53 of the FIG. 5 beyond the storage capacity and character data 53c with an early update date and time was deleted. In this case, the processor 10 abandons the backup data related to this FIG. 5 stored in the secondary storage part 17. The processor 10 selects the data with the latest update date and time from the character data 53c read from the FIG. 5. The processor 10 performs the game processing by the game processing part 23 with a character in which the latest character capability values are reflected.

When there is no character data 53c in the FIG. 5, for example, a possibility is considered that the user has initialized this FIG. 5. In this case, the processor 10 abandons the backup data related to this FIG. 5 stored in the secondary storage part 17, and treats this FIG. 5 as a new one. However, the processor 10 may write the backup data stored in the secondary storage part 17 to the FIG. 5.

In any case, when writing data to the FIG. 5, the processor 10 additionally writes new character data 53c to the FIG. 5. The count value of the new character data 53c is set to 1. The processor 10 additionally stores the backup data of the character data 53c written to the FIG. 5, into the save data 18 of the secondary storage part 17.

(d) A Case where the Character Data 53c is Present in the FIG. 5 and the Backup Data is Absent in the Save Data 18

In this case, the data determination part 24 determines that no fraud was committed with respect to this FIG. 5. This condition can occur, for example, when writing to the FIG. 5 is performed beyond the number of pieces of data that can be backed up in the secondary storage part 17 of the game apparatus 1 and backup data with an early update date and time is deleted. The processor 10 stores, of the pieces of the character data 53c read from the FIG. 5, the piece of the character data 53c the game apparatus ID and the save data ID of which coincide, as the backup data in the save data 18 of the secondary storage part 17. Thereafter, the processor 10 can treat this FIG. 5 as in the above-described case (a).

<Processing Procedure>

Figure 7:
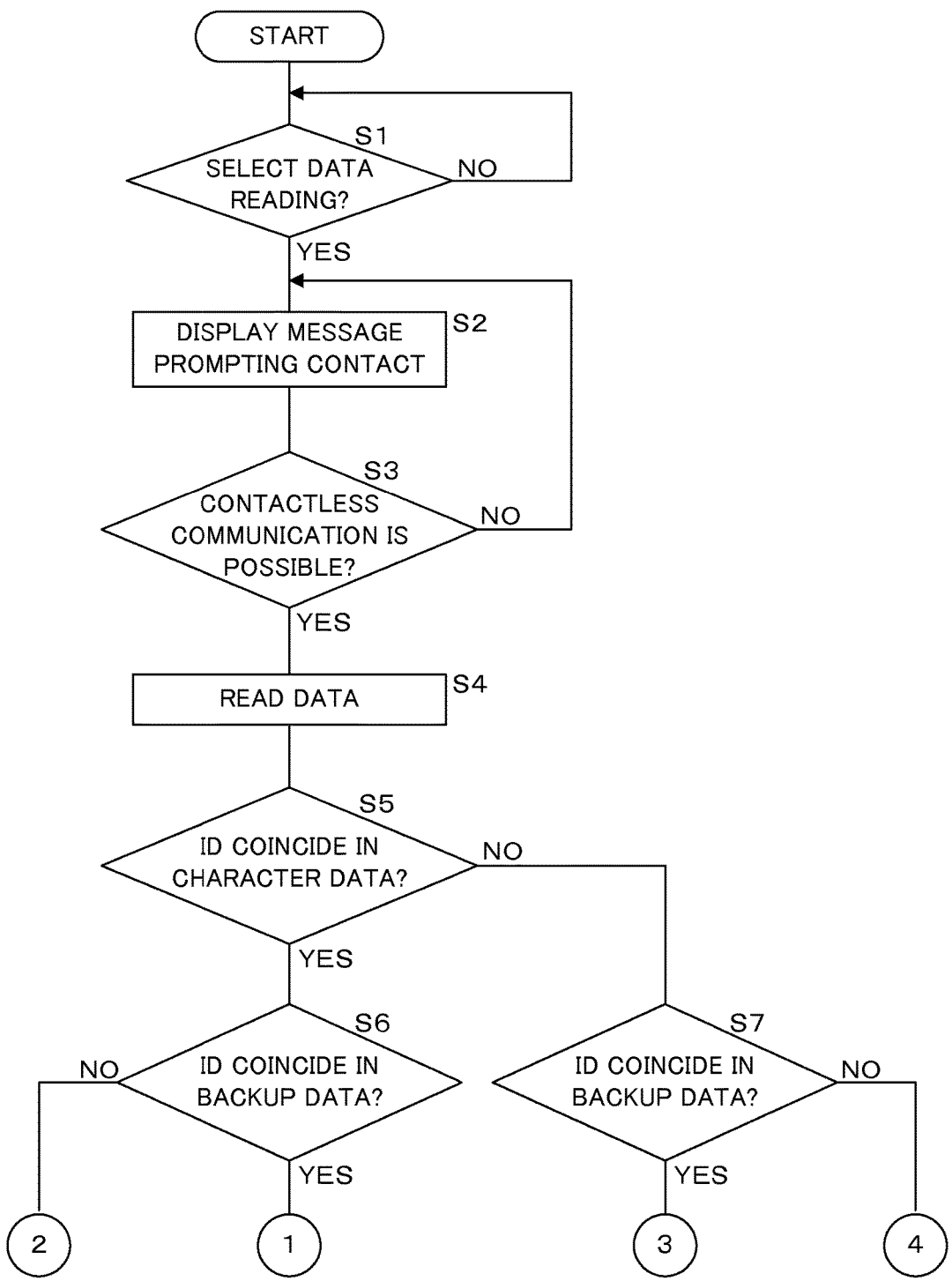
FIG. 7 shows an example non-limiting flowchart showing the procedure of the processing of data reading from the figure performed by the game apparatus according to the present example embodiment.
Figure 9:
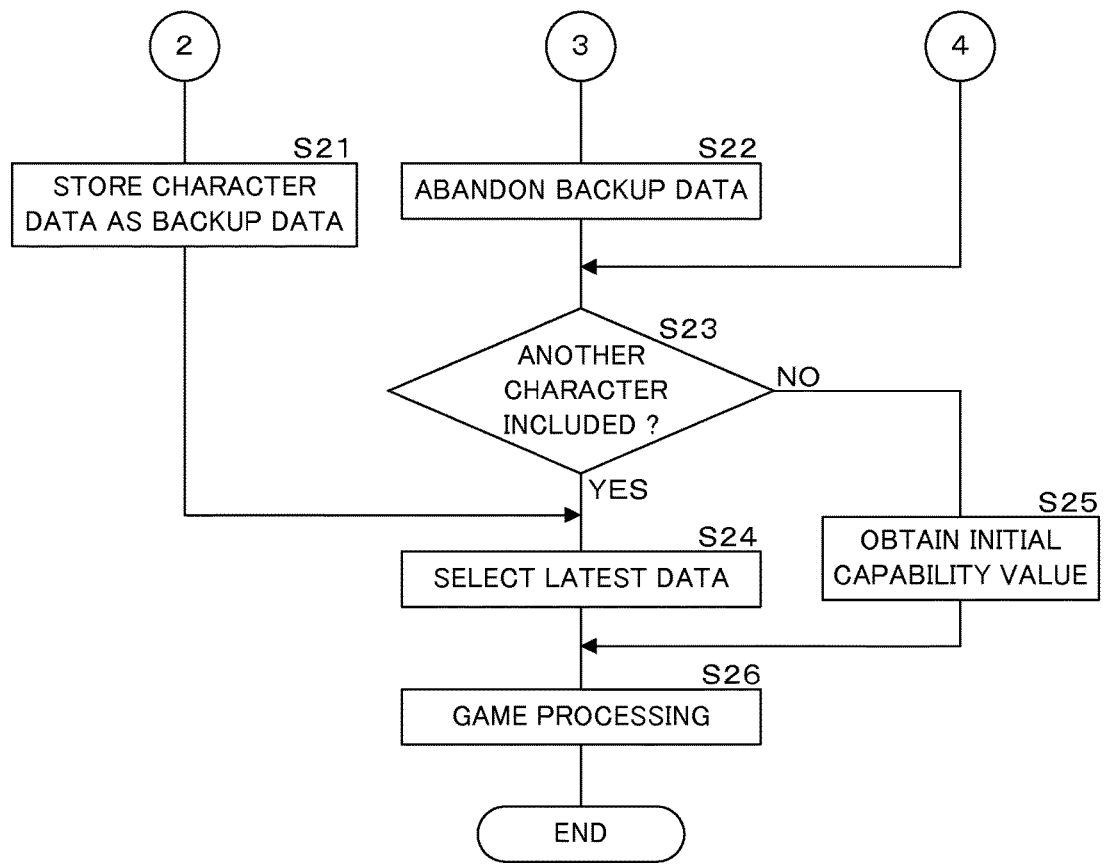
FIG. 9 shows an example non-limiting flowchart showing the procedure of the processing of data reading from the figure performed by the game apparatus according to the present example embodiment.

FIGS. 7 to 9 show example non-limiting flowcharts showing the procedure of the processing of data reading from the FIG. 5 performed by the game apparatus 1 according to the present example embodiment. The processor 10 of the game apparatus 1 determines whether the item of data reading from the FIG. 5 is selected, for example, from a menu screen related to the game displayed on the display 11 or not (step S1). When the item of data reading is not selected (S1: NO), the processor 10 waits until the item of data reading is selected.

When the item of data reading is selected (S1: YES), the processor 10 displays on the display 11a message prompting the user to bring the FIG. 5 into contact with the predetermined area of the game apparatus 1 (step S2). The processor 10 periodically transmits to the FIG. 5, for example, an instruction to transmit the FIG. 1D 53a by the contactless communication part 14. The processor 10 determines whether contactless communication with the FIG. 5 has become possible or not, for example, according to whether the FIG. 1D 53a has been obtained or not as a response to this transmission instruction (step S3). When contactless communication with the FIG. 5 has not become possible (S3: NO), the processor 10 returns the process to step S2 to continue the message display.

When contactless communication with the FIG. 5 becomes possible (S3: YES), the data reading part 22 of the processor 10 reads data such as the game data 53b and the character data 53c stored in the storage part 53 of the FIG. 5 by the contactless communication (step S4). The date determination part 24 of the processor 10 determines whether data having IDs coinciding with the game apparatus ID assigned to the own game apparatus 1 and the save data ID of the save data 18 stored in the secondary storage part 17 is included in the read character data 53c or not (step S5). When the character data 53c the game apparatus ID and the save data ID of which coincide is included (S5: YES), the data determination part 24 determines whether data having IDs coinciding with the FIG. 1D read from the FIG. 5 with which contactless communication was performed, the own game apparatus ID and the save data ID is included in the backup data 18c of the save data 18 or not (step S6).

When the backup data 18c the FIG. 1D, the game apparatus ID and the save data ID of which coincide is included (S6: YES), this is the above-described case (a). The data determination part 24 performs the count value comparison and determines whether a count value Nf included in the character data 53c of the FIG. 5 is higher than a count value Nb included in the backup data 18c or not (step S11). When the count value Nf is higher than the count value Nb (S11: YES), the processor 10 displays on the display 11a message warning that the data in the FIG. 5 is overwritten (step S12). At this time, the processor 10 accepts an operation on the operation part 12 to thereby accept a selection of whether to perform data overwriting or not (step S13). When a selection of not performing overwriting is accepted (S13: NO), the processor 10 ends the processing without performing the game processing using the FIG. 5.

When a selection of performing overwriting of the FIG. 5 is accepted (S13: YES), the data writing part 21 of the processor 10 writes the backup data 18c stored in the save data 18 of the secondary storage part 17 to the FIG. 5 by contactless communication (step S14). That is, the character data 53c of the FIG. 5 is rewritten to the backup data 18c. After the overwriting of the FIG. 5 is completed, the processor 10 checks the update date and time with respect to the data written at step S14 for the own game apparatus 1 and with respect to the data read at step S4 for other game apparatuses 1. The processor 10 selects the latest data (substantially, its own data written at step S14) from among these pieces of data (step S15). The processor 10 performs the game processing with the character based on the selected latest data (step S16), and ends the processing.

When it is determined that the count value Nf is not more than the count value Nb at step S11 (S11: NO), the processor 10 selects the data with the latest update date and time from one or more than one piece of character data 53c read from the FIG. 5 (step S15). The game processing part 23 of the processor 10 performs the game processing with the character based on the selected latest data (step S16), and ends the processing.

When the backup data 18c the FIG. 1D, the game apparatus ID and the save data ID of which coincide is not included in the save data 18 at step S6 (S6: NO), this is the above-described case (d). In this case, the processor 10 advances the process to step S21. The processor 10 stores the character data 53c with coinciding IDs read from the FIG. 5 in the secondary storage part 17 as the backup data 18c of this FIG. 5 (step S21). The processor 10 selects the data with the latest update date and time from one or more than one piece of character data 53c read from the FIG. 5 (step S24). The game processing part 23 of the processor 10 performs the game processing with the character based on the selected latest data (step S26), and ends the processing.

When data the game apparatus ID and the save data ID of which coincide is not included in the character data 53c read from the FIG. 5 at step S5 (S5: NO), the data determination part 24 determines whether data having IDs coinciding with the FIG. 1D, the own game apparatus ID and the save data ID is included in the backup data 18c of the save data 18 or not (step S7).

When the backup data 18c the FIG. 1D, the game apparatus ID and the save data ID of which coincide is included (S7: YES), this is the above-described case (c). In this case, the processor 10 abandons this backup data 18c from the save data 18 of the secondary storage part 17 (step S22), and advances the process to step S23. When the backup data 18c the FIG. 1D, the game apparatus ID and the save data ID of which coincide is not included (S7: NO), this is the above-described case (b). In this case, the processor 10 advances the process to step S23.

The data determination part 24 of the processor 10 determines whether another character data 53c the IDs of which do not coincide is included in the character data 53c read from the FIG. 5 or not (step S23). When another character data 53c is included (S23: YES), the processor 10 selects the data with the latest update date and time (step S24). The processor 10 performs the game processing with the character based on the selected latest data (step S26), and ends the processing. When another character data 53c is not included (step S23: NO), the processor 10 obtains the initial capability values of the character corresponding to the FIG. 1D 53a of the FIG. 5 (step S25). The processor 10 performs the game processing with the character based on the obtained initial capability (step S26), and ends the processing.

Figure 10:
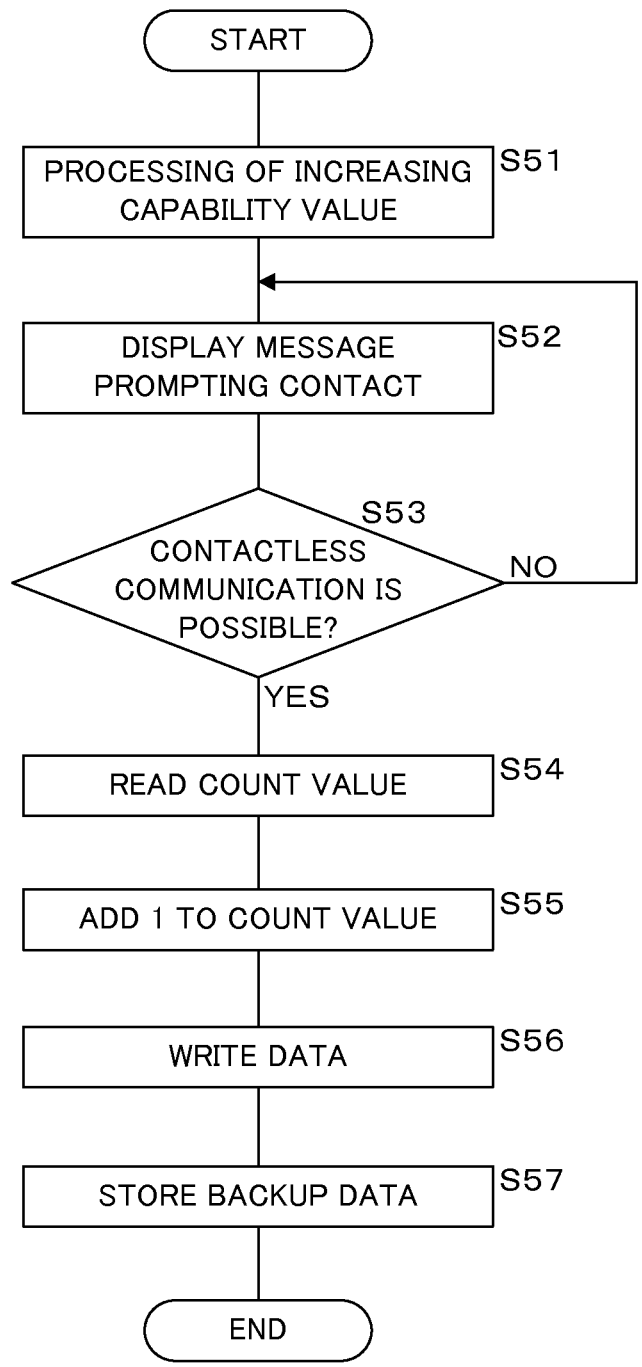
FIG. 10 shows an example non-limiting flowchart showing the procedure of the processing of data writing to the figure performed by the game apparatus according to the present example embodiment.

FIG. 10 shows an example non-limiting flowchart showing the procedure of the processing of data writing to the FIG. 5 performed by the game apparatus 1 according to the present example embodiment. In the game processing by the game processing part 23, the processor 10 of the game apparatus 1 performs the processing of increasing a capability value of the game character based on the operation on the operation part 12 (step S51). After the capability value increase processing, the processor 10 displays on the display 11a message prompting the user to bring the FIG. 5 into contact with the predetermined area of the game apparatus 1 (step S52). The processor 10 determines whether contactless communication with the FIG. 5 has become possible or not (step S53). When contactless communication with the FIG. 5 has not become possible (S53: NO), the processor 10 returns the process to step S52 to continue the message display.

When contactless communication with the FIG. 5 has become possible (S53: YES), the count processing part 25 of the processor 10 reads the number of times of data writing to this FIG. 5, that is, the count value (step S54). While the count processing part 25 reads the count value from the backup data 18c of the secondary storage part 17 in the present example embodiment, the count value may be read from the FIG. 5 by contactless communication. The count processing part 25 performs the processing of adding 1 to the read count value (step S55). Then, the data writing part 21 of the processor 10 writes data including information such as the game apparatus ID, the save data ID, the increased capability value, the increased count value and the update date and time to the FIG. 5 by contactless communication (step S56). The processor 10 stores the data written to the FIG. 5 to which data the FIG. 1D 53a of this FIG. 5 is added, in the save data 18 of the secondary storage part 17 as the backup data 18c (step S57), and ends the processing.

<Summary>

The information processing system according to the present example embodiment having the above-described structure is structured so that the contactless communication part 14 of the game apparatus 1 performs contactless communication with the contactless communication part 52 of the IC tag 50 of the FIG. 5 and the data writing part 21 of the game apparatus 1 writes data related to the game to the storage part 53 of the FIG. 5. The processor 10 of the game apparatus 1 stores the data written to the FIG. 5 by the data writing part 21, into the secondary storage part 17 as the backup data 18c. When reading data from the FIG. 5, the data determination part 24 of the processor 10 determines whether the character data 53c stored in the FIG. 5 and the backup data 18c stored in the secondary storage part 17 have a predetermined relationship with each other or not. When these pieces of data do not have the predetermined relationship with each other, the processor 10 overwrites the character data 53c of the FIG. 5 with the backup data 18c in the secondary storage part 17. By doing this, even when the data in the FIG. 5 is altered fraudulently, the altered data can be returned to the data backed up by the game apparatus 1.

The processor 10 of the game apparatus 1 generates the save data 18 related to the progress of the game and stores it into the secondary storage part 17. To the save data 18, a unique save data ID 18a is assigned, and the save data 18 includes this save data ID 18a. The data writing part 21 of the game apparatus 1 writes the character data 53c including the save data ID 18a to the FIG. 5. The data determination part 24 determines, as the predetermined relationship, whether the save data ID of the character data 53c written to the FIG. 5 and the save data ID 18c of the backup data 18c stored in the secondary storage part 17 coincide with each other or not. The data determination part 24 determines whether the save data ID 18a included in the save data 18 of the game apparatus 1, the save data ID included in the backup data 18c of the save data 18 and the save data ID included in the character data 53c of the FIG. 5 coincide with one another or not.

To the game apparatus 1, a unique game apparatus ID is assigned. The data writing part 21 of the game apparatus 1 writes the character data 53c including the game apparatus ID to the FIG. 5. The data determination part 24 determines, as the predetermined relationship, the game apparatus ID of the character data 53c written to the FIG. 5 and the game apparatus ID of the backup data 18c stored in the secondary storage part 17 coincide with each other or not. By determining whether the information such as the save data IDs and the game apparatus IDs coincide with each other or not, whether the character data 53c of the FIG. 5 and the backup data 18c of the game apparatus 1 coincide with each other or not can be determined with ease and reliability.

In the game according to the present example embodiment, the user can increase the character capability values by consuming points obtained through playing of the game and write the increased capability values to the FIG. 5. The game apparatus 1 stores information on the points possessed by the user in the save data 18. The save data 18 includes the backup data 18c of the character data 53c written to the FIG. 5. These enables prevention of a fraud where the save data 18 is copied to another recording medium or the like and character capability value increase is repetitively performed.

The count processing part 25 of the game apparatus 1 calculates the number of times of data writing to the FIG. 5 as the count value. The character data 53c written to the FIG. 5 and the backup data 18c of the secondary storage part 17 include the calculated count value. The data determination part 24 of the game apparatus 1 compares the count values of these pieces of data. The data determination part 24 determines whether the count value of the character data 53c is higher than the count value of the backup data 18c or not. When the count value of the character data 53c is higher than the count value of the backup data 18c, the data writing part 21 of the processor 10 writes the backup data 18c to the FIG. 5. By doing this, whether the character data 53c of the FIG. 5 and the backup data 18c of the game apparatus 1 satisfy the predetermined relationship or not can be determined with ease.

In the storage part 53 of the FIG. 5, a plurality of pieces of character data 53c can be stored so as to be associated with the game apparatuses 1 on which the data writing was performed. The data determination part 24 makes the determination with respect to, of the pieces of character data 53c stored in the FIG. 5, any one of the pieces of character data 53c associated with the own game apparatus 1 and the backup data 18c of the secondary storage part 17 associated with this FIG. 5. By doing this, the user can use one FIG. 5 on a plurality of game apparatuses 1. The user can use a plurality of FIG. 5 on one game apparatus 1.

While in the present example embodiment, description is given by using as an example a game where a player character operated by the user attacks enemy characters, the contents of the game are an example and the example embodiment is not limited thereto. While the character capability values are stored in the storage part 53 of the FIG. 5, the example embodiment is not limited thereto. For example, the stages appearing in the game and the weapons, the items or the like used by the player character may be stored in a data storage medium, or other data may be stored therein. The structure of the display screen shown in FIG. 1 is an example and the example embodiment is not limited thereto.

The technology herein may be applied not only to games but also to various other applications. The technology herein is suitable for an application that performs data writing to a data storage medium and where it is desired that fraudulent rewriting of the data stored in the data storage medium or the like be prevented. For example, the technology herein may be applied to a structure that writes data such as electronic money or cashable points, to a data storage medium. In any case, the technology herein may be applied to a structure in which data generated or updated by information processing is written to a data storage medium by contactless communication.

In the present example embodiment, when it is determined that the data stored in the FIG. 5 has been fraudulently rewritten, the game apparatus 1 does not perform the game processing using the FIG. 5 unless overwriting with the backup data is performed; however, the example embodiment is not limited thereto. For example, the game apparatus 1 may have a structure in which although game playing based on the character data read from the FIG. 5 where it is determined that a fraud was committed is permitted, increase of the capability values of this character, writing of an increased capability value to the FIG. 5 or the like is not permitted.

While description is given by using the portable game apparatus 1 as an example in the present example embodiment, the example embodiment is not limited thereto. A similar technology may be applied to various information processing apparatuses such as stationary game apparatuses, general-purpose computers, tablet terminal apparatuses and mobile telephones. In the case of stationary game apparatuses, the contactless communication part 14 may be incorporated in a transportable controller or the like instead of being incorporated in the main unit. In the case of an apparatus such as a general-purpose computer that does not incorporate the contactless communication part 14, a different apparatus that performs contactless communication may be connected by cable or by radio.

While the data storage medium is the FIG. 5, the example embodiment is not limited thereto, and the data storage medium may be an IC card or the like or may be a different medium. While the game apparatus 1 performs contactless communication according to the NFC standard, the example embodiment is not limited thereto, and contactless communication may be performed according to a different communication standard. Some or all of the processings performed by the processor 10 of the game apparatus 1 may be performed by a different apparatus such as a server apparatus so that the processings are implemented through collaboration between a plurality of apparatuses.

While the components from the data writing part 21 to the count processing part 25 are provided as software functional blocks in the processor 10 by the processor 10 of the game apparatus 1 executing the game program 91, the example embodiment is not limited thereto. Some functions of the components from the data writing part 21 to the count processing part 25 may be provided, for example, as functions of the OS (operating system). The components from the data writing part 21 to the count processing part 25 may be provided as hardware functional blocks.

While the game apparatus 1 has a structure in which the save data 18 is stored in the secondary storage part 17 incorporated therein, the example embodiment is not limited thereto. For example, the save data 18 may be stored in the recording medium 9 attached to the storage medium attachment part 13 in the game apparatus 1. While the processor 10 of the game apparatus 1 may create and store the backup data 18c in the save data 18 when performing data writing to the FIG. 5, the example embodiment is not limited thereto. For example, the game apparatus 1 may have a structure in which when data reading from the FIG. 5 is performed, the save data 18 is created and stored and this is updated at the time of data writing. While the game apparatus 1 has a structure in which the character data 53c related to the own apparatus is stored as the backup data 18c, the example embodiment is not limited thereto. For example, the game apparatus 1 may have a structure in which all the pieces of character data 53c stored in the FIG. 5 are stored as the backup data 18c. While the game apparatus 1 has a structure in which the number of times of data writing is stored as the count value in the character data 53c and the backup data 18c and it is determined that a fraud was committed when the count value of the character data 53c is higher than the count value of the backup data 18c, the example embodiment is not limited thereto. For example, in the game apparatus 1, instead of using the count value, it may be determined that a fraud was committed when the pieces of information from the game apparatus ID to the update date and time included in the character data 53c and those included in the backup data 18c do not coincide with each other.

While in the present example embodiment, the IC tag 50 is provided in the FIG. 5 and the IC tag 50 performs data storage, communication with the game apparatus 1 and the like, the example embodiment is not limited thereto. For example, a circuit board mounted with a CPU, a memory IC, an IC for contactless communication and the like may be provided in the FIG. 5 to perform data storage, communication with the game apparatus 1 and the like. While the IC tag 50 is of a passive type having no power source such as a battery in the present example embodiment, an active-type IC tag may be adopted.

While the information processing apparatus and the data storage medium perform communication according to the NFC standard in the present example embodiment, the example embodiment is not limited thereto. The communication between the information processing apparatus and the data storage medium may be performed according to any communication standard. For example, the information processing apparatus and the data storage medium may perform communication according to a standard such as RFID. Moreover, for example, the information processing apparatus and the data storage medium may perform communication through a physical or electric contact instead of contactless communication.

It is to be understood that elements and the like in singular form preceded by an article "a" or "an" each do not exclude more than one element related thereto when used in the present specification.

In the information processing apparatus according to the present example embodiment, the data written to the data storage medium is stored, and when this data and the data in the data storage medium do not have the predetermined relationship with each other, the data in the data storage medium is overwritten with the stored data. By doing this, the data stored in the data storage medium can be prevented from being updated fraudulently.

What is claimed is:

1. An information processing apparatus comprising:
   contactless communication circuitry configured to perform contactless communication with a data storage medium having a contactless communication function;
   a processor configured to execute a game and write data to the data storage medium by the contactless communication circuitry; and
   a storage memory configured to store the data to be written by the processor and for use in the game; wherein
   the processor is further configured to determine whether the data stored in the data storage medium and the data stored in the storage memory have a predetermined relationship with each other or not and to determine a presence or absence of a fraud according to the determination of whether the data stored in the data storage medium and the data stored in the storage memory have the predetermined relationship with each other or not,
   when the processor determines that both of the data do not have the predetermined relationship with each other, the processor determines the presence of the fraud and overwrites the data stored in the data storage medium with the data stored in the storage memory; and
   wherein the processor is further configured to perform the determination by regarding a case that the data stored in the data storage medium and the data stored in the storage memory coincide with each other as the predetermined relationship.

2. The information processing apparatus according to claim 1, wherein
   the processor is further configured to generate writing identification information to identify data writing by the processor,
   the storage memory is further configured to store the writing identification information generated by the processor,
   the processor is further configured to write data including the generated writing identification information, to the data storage medium, and
   the processor is further configured to perform the determination by at least regarding a case that the writing identification information stored in the data storage medium and the writing identification information stored in the storage memory coincide with each other as the predetermined relationship.

3. The information processing apparatus according to claim 2,
   wherein the writing identification information is a count value which increases every time the processor performs data writing, and
   the processor is further configured to the determination by regarding a case that the count value stored in the data storage medium is not more than the count value stored in the storage memory as the predetermined relationship.

4. The information processing apparatus according to claim 2, wherein:
   the processor is further configured to perform information processing and generate progress information related to progress of information processing performed by the processor,
   wherein the storage memory is further configured to store data including progress information identification information for identifying the progress information,
   the processor is further configured to write the data including the progress information identification information to the data storage medium, and
   the processor is further configured to perform the determination by at least regarding a case that the writing identification information stored in the data storage medium and the writing identification information stored in the storage memory coincide with each other when the progress information identification information included in the data stored in the data storage medium and the progress information identification information included in the data stored in the storage memory coincide with each other as the predetermined relationship.

5. The information processing apparatus according to claim 4, wherein the storage memory is further configured to store the progress information including the progress information identification information, and the processor is further configured to perform the determination by at least regarding a case that the writing identification information stored in the data storage medium and the writing identification information stored in the storage memory coincide with each other when the progress information identification information included in the data stored in the data storage medium, the progress information identification information included in the data stored in the storage memory and the progress information identification information included in the progress information stored in the storage memory coincide with one another as the predetermined relationship.

6. The information processing apparatus according to claim 4, wherein the progress information includes numerical information that increases or decreases according to the information processing, and the processor is further configured to update the data stored in the data storage medium with a decrease of the numerical information.

7. The information processing apparatus according to claim 4, wherein:

the processor is further configured to read the data stored in the data storage medium by the contactless communication circuitry, the processor is further configured to perform the information processing based on the data read by the processor and updates the data, and the processor is further configured to write the data updated by the processor, to the data storage medium.

8. The information processing apparatus according to claim 7, wherein the processor is further configured to perform the determination when the processor performs the data reading.

9. The information processing apparatus according to claim 1, wherein the data storage medium is capable of storing a plurality of pieces of data, and the processor is further configured to determine whether any of the pieces of data stored in the data storage medium and the data stored in the storage memory have the predetermined relationship with each other or not.

10. A system comprising:

contactless communication circuitry configured to perform contactless communication with a data storage medium having a contactless communication function;

a processing system, including at least one computer processor, configured to execute a game and write data to the data storage medium by the contactless communication circuitry; and a storage memory configured to store the data to be written by the processing system and for use in the game; wherein the processing system is further configured to determine whether the data stored in the data storage medium and the data stored in the storage memory have a predetermined relationship with each other or not and to determine a presence or absence of a fraud according to the determination of whether the data stored in the data storage medium and the data stored in the storage memory have the predetermined relationship with each other or not, when the processing system determines that both of the data do not have the predetermined relationship with each other, the processing system determines the presence of the fraud and overwrites the data stored in the data storage medium with the data stored in the storage memory; and wherein the processing system is further configured to perform the determination by regarding a case that the data stored in the data storage medium and the data stored in the storage memory coincide with each other as the predetermined relationship.

11. An information processing method comprising:

performing, using contactless communication circuitry, contactless communication with a data storage medium having a contactless communication function and writing data to the data storage medium;

performing processing of executing a game and storing data to be written to a storage memory for use in the game;

determining, using a computer processor, whether the data stored in the data storage medium and the data stored in the storage memory have a predetermined relationship with each other or not;

determining a presence or absence of a fraud according to the determination of whether the data stored in the data storage medium and the data stored in the storage memory have the predetermined relationship with each other or not when determining that both of the data do not have the predetermined relationship with each other, determining the presence of the fraud and overwriting the data stored in the data storage medium with the data stored in the storage memory; and wherein the determination is performed by regarding a case that the data stored in the data storage medium and the data stored in the storage memory coincide with each other as the predetermined relationship.

12. A non-transitory recording medium recording a computer program that causes a computer to at least provide operation comprising:

perform contactless communication, using contactless communication circuitry, with a data storage medium having a contactless communication function and writes data to the data storage medium;

perform processing of executing a game and storing the data to be written and for use in the game, to a storage memory;

determine whether the data stored in the data storage medium and the data stored in the storage memory have a predetermined relationship with each other or not, determine a presence or absence of a fraud according to the determination of whether the data stored in the data storage medium and the data stored in the storage memory have the predetermined relationship with each other or not;

determine the presence of the fraud and overwrite the data stored in the data storage medium with the data stored in the storage memory when the determination is made that both of the data do not have the predetermined relationship with each other;

wherein the determination is performed by regarding a case that the data stored in the data storage medium and the data stored in the storage memory coincide with each other as the predetermined relationship.

* * * * *